(12) United States Patent
Yamazaki et al.

(10) Patent No.: US 6,925,217 B2
(45) Date of Patent: Aug. 2, 2005

(54) OPTICAL WAVEGUIDE DEVICE, VARIABLE OPTICAL ATTENUATOR, AND OPTICAL SWITCH

(75) Inventors: Hiroyuki Yamazaki, Minato-ku (JP); Takafumi Oguma, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/981,787

(22) Filed: Nov. 5, 2004

(65) Prior Publication Data

US 2005/0100260 A1 May 12, 2005

(30) Foreign Application Priority Data

Nov. 7, 2003 (JP) ........................ 2003-378550

(51) Int. Cl.[7] ............... G02B 6/12; G01C 19/72
(52) U.S. Cl. ............... 385/14; 385/15; 385/16; 385/39; 385/40; 385/130; 385/131; 385/140; 356/450; 356/460
(58) Field of Search ............... 385/14, 15, 16, 385/39, 40, 130, 129, 131, 140; 356/450, 460

(56) References Cited

U.S. PATENT DOCUMENTS

| | | | | |
|---|---|---|---|---|
| 4,781,424 A | * | 11/1988 | Kawachi et al. | 385/132 |
| 5,044,715 A | * | 9/1991 | Kawachi et al. | 385/42 |
| 5,513,285 A | * | 4/1996 | Kawashima et al. | 385/16 |
| 5,881,199 A | * | 3/1999 | Li | 385/140 |
| 5,940,548 A | * | 8/1999 | Yamada et al. | 385/14 |
| 2004/0141691 A1 | * | 7/2004 | Wiesmann et al. | 385/40 |
| 2004/0208421 A1 | * | 10/2004 | Kitagawa | 385/16 |

FOREIGN PATENT DOCUMENTS

| | | | | |
|---|---|---|---|---|
| EP | 1022606 A | 7/2000 | | 385/24 X |
| JP | H05-150275 A | 6/1993 | | 385/14 X |
| JP | H06-034924 A | 2/1994 | | 385/14 X |
| JP | H10-020348 A | 1/1998 | | 385/14 X |

* cited by examiner

Primary Examiner—Brian M. Healy
(74) Attorney, Agent, or Firm—Sughrue Mion, PLLC

(57) ABSTRACT

An optical waveguide device used as, for example, a variable optical attenuator or an optical switch includes: a substrate; a Mach-Zehnder interferometer that is provided on the substrate and that includes first and second waveguide sections interposed between a pair of branches; a heater that includes a conductive thin-film formed at a position corresponding to the first waveguide section and that, by emitting heat, heats the first waveguide section and thus causes a phase shift in the optical signal propagated in the first waveguide section; and a resistor connected, in series with the heater, to a power supply which supplies power to the heater. The resistor has a temperature coefficient of resistance that is lower than that of the heater. The waveguide device is preferably formed as a device having a silica glass waveguide structure.

15 Claims, 5 Drawing Sheets

OPTICAL WAVEGUIDE DEVICE, VARIABLE OPTICAL ATTENUATOR, AND OPTICAL SWITCH

BACKGROUND OF THE INVENTION

1. Field of the Invention

The present invention relates to an optical waveguide device such as a variable optical attenuator or optical switch that is used in the technical field of optical signal transmission and that uses the phase shift of an optical signal. More particularly, the present invention relates to an optical waveguide device that uses the thermo-optical effect, and to a variable optical attenuator array or optical switch array that is configured by arranging a plurality of these waveguide devices on the same substrate.

2. Description of the Related Art

With the expansion of the amount of information transfer that passes over telecommunication networks, WDM (Wavelength Division Multiplexing) transmission systems that dramatically increase the transmission capacity of optical fiber circuits have come into wide use. In a WDM transmission system, since signal light of a plurality of wavelengths is transmitted over a single optical fiber, light amplifiers are therefore widely used for compensating for optical loss or for boosting optical power. EDFAs (Erbium Doped Fiber Amplifiers) are the most widely used light amplifiers.

An EDFA is a direct light amplifier and uses optical fiber in which erbium (Er) has been added to the core of the optical fiber, and although such amplifiers have the characteristic of large light amplification gain, their amplification characteristics are also strongly dependent on wavelength. When the optical transmission path is designed with an EDFA having large wavelength dependency, the optical power level that is applied to the optical fiber will vary widely between channels that each have a different wavelength, and deterioration in the optical waveform may therefore occur due to such factors as nonlinearity in a portion of the channels. Various measures have been introduced for compensating for this wavelength dependency of EDFA.

As one such measure, a method has been adopted in which a loss medium for compensating for fluctuation in the gain of an EDFA is introduced in the optical transmission path, whereby the light amplification gain of EDFA is made uniform. Examples of such a loss medium that can be used include a long-period fiber Bragg grating in which a portion of the optical fiber is subjected to optical processing or an optical component in which a multiplicity of FP etalons are combined. The overall wavelength dependency of gain can thus be reduced by increasing the loss due to the loss medium in wavelength regions having large EDFA gain.

Nevertheless, gain adjustment that employs a loss medium has limits when the wavelength region extends over a wide bandwidth. In one method in actual use, optical attenuators are inserted for each channel of a WDM transmission system and the optical power is then fine-adjusted for each channel. A Mach-Zehnder type variable optical attenuator (VOA) is used for this purpose.

FIGS. 1A and 1B show the configuration of a Mach-Zehnder variable optical attenuator of the prior art. Variable optical attenuator 100 shown in the figure employs substrate 101 in the form of a flat sheet made of silica glass on which planar lightwave circuits (PLCs) are constructed. Glass waveguide 102 is embedded in the interior of substrate 101, and in the center portion of substrate 101, glass waveguide 102 is branched into two waveguide sections 102A and 102B. In other areas, incident-side waveguide section 102C and emission-side waveguide section 102D are formed. In other words, light that is incident from waveguide section 102C is branched into two beams by the Y-branch to waveguide sections 102A and 102B, and then combined by another Y-branch to be emitted to the outside from waveguide section 102D.

Heater 109 is formed on the surface of substrate 101 at a position that is above waveguide section 102A. First and second electrodes 107 and 108 are formed on the surface of substrate 101 for supplying electric power to heater 109, and heater 109 is electrically connected between electrodes 107 and 108. The application of a prescribed voltage from a power supply circuit (not shown) to first and second electrodes 107 and 108 causes heater 109 to turn ON and give off heat, whereby waveguide section 102A that corresponds to this heater 109 is heated. Generally, metals, which can be incorporated in the processes during formation of the waveguides, such as gold (Au), platinum (Pt), and chromium (Cr) are used in first and second electrodes 107 and 108 and heater 109. These metals feature low specific resistance, no deterioration, extremely stable characteristics (particularly for gold and platinum), and are amenable to evaporation.

In this configuration, the two waveguide sections 102A and 102B have the same length, and the temperature of the two waveguide sections 102A and 102B is equal when heater 109 does not emit heat. In this state, light that is propagated in waveguide section 102C on the input side is branched by two waveguide sections 102A and 102B and then combined at waveguide section 102D on the output side in the same phase state. Light that is combined at waveguide section 102D on the output side therefore has no phase difference and no loss occurs.

In contrast, when the flow of current in heater 109 causes heating of one waveguide section 102A, the refractive index of that waveguide section 102A increases. As a result, of the light that is branched between the two waveguide sections 102A and 102B, the phase of light that is propagated through waveguide section 102A that has been heated is gradually shifted and delayed depending on the increase in temperature. Therefore, a phase difference is produced between the light that is propagated through one waveguide section 102A and light that is propagated through the other waveguide section 102B. The light that is supplied from waveguide section 102D on the output side is attenuated as this phase difference approaches 180 degrees (i.e., the $\pi$ radian). The maximum attenuation of the light output is reached when the phases of the light that is propagated through the two waveguide sections 102A and 102B differ by 180 degrees. When the phase of the light that is propagated through waveguide section 102A is further shifted, the phases of the two beams approach the same phase, and the light that is supplied from waveguide section 102D on the output side increases.

Japanese Patent Laid-Open Publication No. 10-20348 (JP, 10-020348A) discloses a thermo-optic phase shifter and optical attenuator that employ a polymer optical waveguide and that operate based on the principles described above.

However, it is known that the characteristics of waveguide devices that use the thermo-optic effect, such as optical phase shifters, optical switches, and optical attenuators, change with the ambient temperature. For example, if a fixed voltage is applied to a heater of a waveguide device, the level of light attenuation will vary according to the ambient temperature. The nature of this change in the characteristics will vary depending on the materials used to construct the waveguide device or the configuration of the waveguide device. For example, a measurement of the temperature dependency of the extinction characteristics in the variable optical attenuator shown in FIGS. 1A and 1B produces the measurement results that are shown in FIG. 2. Here, $V_\pi$ is the voltage at which the extinction ratio reaches a maximum, this being the ratio of the maximum intensity to the minimum intensity of transmitted light in variable optical attenuator 100. This voltage $V_\pi$ tends to increase together with increase in temperature T. Even if variable optical attenuator 100 is set to a prescribed amount of light loss, this amount of loss will fluctuate with fluctuations in ambient temperature, with the resulting problem that the amount of loss of light cannot be set with high accuracy.

Various investigations have been conducted regarding the reasons for this change in the amount of loss of light due to temperature. In Japanese Patent Laid-Open Publication No. 6-34924 (JP, 6-034924A), the change in the temperature of the resistance of the heater that heats one waveguide section is taken as the source of the problem. In an optical phase shifter and optical switch which are based on the thermo-optical effect and which employ silica glass optical waveguides, and further, use directional couplers in the waveguide branches, the invention of JP 6-434924A therefore specifies the range of the temperature coefficient of resistance of the material that makes up a thin-film heater which heats one waveguide section in the optical phase shifter and optical switch. However, despite the reduction of the temperature coefficient of resistance of the material that makes up the thin-film heater, the temperature dependency remains to a significant degree.

For preventing fluctuations in the amount of light loss that are caused by temperature fluctuations, it has also been proposed that a waveguide device such as a variable optical attenuator be provided with a temperature control circuit for reducing temperature fluctuation of the device itself. However, the provision of a temperature control circuit introduces the problems of the resulting complexity of the circuit configuration of the waveguide device and further, the increase in product cost for realizing a highly accurate circuit.

Japanese Patent Laid-Open Publication No. 5-150275 (JP, 5-150275A) discloses the arrangement of a device in which an assembly of normal resistance and thermistor connected in series is connected to a thin-film heater in parallel as a temperature compensation circuit in an optical switch that is based on the thermo-optical effect and that uses silica glass optical waveguides and directional couplers in the waveguide branches. This temperature compensation circuit takes into consideration the temperature dependency of thermal conductivity in a waveguide device and compensates for the temperature dependency of the waveguide device by controlling the electric power that is applied to the heater.

The foregoing explanation regarding changes in attenuation characteristics that accompany fluctuations in the ambient temperature assumed the case of a single variable optical attenuator, but the problems are still more complex in an array device in which variable optical attenuators of the same configuration are formed on the same substrate as a multiple-channel configuration. In an arrayed waveguide device that is formed with this type of array configuration, causing a heater to emit heat to adjust the corresponding optical attenuator that is provided for a particular channel heats not only the corresponding part of the substrate, but also conveys heat to its vicinity as well. This causes fluctuation in the amount of loss of light of similar variable optical attenuators, particularly variable optical attenuators in adjacent channels, giving rise to the phenomenon of thermal crosstalk.

To avoid the occurrence of thermal crosstalk, a configuration has been adopted in which a heater is separately incorporated inside the module for temperature control. However, a module of this type of construction necessitates not only the incorporation of a heater but also the implementation of temperature control for the variable optical attenuator of each channel, raising not only the problem of increased module price, but also the problem of wasted power for temperature control. In other words, the problems attending the provision of a temperature control circuit in a single variable optical attenuator become even more prominent.

SUMMARY OF THE INVENTION

Thus, it is an object of the present invention to provide an optical waveguide device such as a variable optical attenuator, a variable optical attenuator array, an optical switch, or an optical switch array that adopts the method of controlling phase by the heat of a heater to allow reduction of fluctuation in characteristics that is caused by changes in temperature such as external temperature by means of a simpler configuration.

The following explanation regards the particulars by which the inventors of the present invention arrived at the present invention.

In order to analyze the cause of temperature dependency in a waveguide device, the inventors of the present invention measured the temperature dependency of the extinction ratio in the variable optical attenuator shown in FIGS. 1A and 1B under conditions in which the amount of generated heat of the heater itself remained uniform despite fluctuations in the electrical resistance of the heater due to changes in the temperature. More specifically, the inventors investigated the relation between the power supplied to the heater and the extinction ratio for each temperature. The results of this investigation are shown in FIG. 3. As shown in FIG. 3, the power $P_\pi$ at which the extinction ratio reached a maximum decreased with increase in temperature. This behavior is believed to result because the temperature dependency of the refractive index of the waveguide is not linear with respect to increase in temperature. Instead, the temperature dependency of the refractive index, i.e., the temperature-refractive index coefficient, increases together with increase in temperature. As is well known, the relation between the power consumption P, the resistance R of the heater and the applied voltage V can be represented by equation (1):

$$P = \frac{V^2}{R}. \tag{1}$$

The variable optical attenuator shown in FIGS. 1A and 1B uses planar lightwave circuits (PLC) having silica glass waveguides, and further, uses a metal such as gold (Au), platinum (Pt), chromium (Cr) as first and second electrodes 107 and 108 for supplying power to heater 109. According to the observations of the inventors, the metal that makes up electrodes 107 and 108 has resistance that is highly dependent on temperature, i.e., has a high temperature coefficient of resistance. This resistance therefore varies widely according to changes in the external temperature or the heat given off by heater 109, with the result that the waveguide device exhibits considerable temperature dependency. In other words, when the resistance component that makes up heater 109 is driven at a low voltage, the resistance of the electrodes fluctuates greatly, and the amount of light loss of the variable optical attenuator itself also fluctuates accordingly.

The inventors of the present invention realized the present invention based on the above-described findings. More specifically, the waveguide device according to the present invention includes: a substrate; a Mach-Zehnder interferometer that is provided on the substrate and that includes first and second waveguide sections interposed between a pair of branches; a heater having a conductive thin-film that is formed at a position corresponding to the first waveguide section and that heats the first waveguide section by emitted heat to cause a phase shift in the light signal propagated in the first waveguide section; and a resistor connected in series with the heater to the power supply which supplies power to the heater, the resistor having a temperature coefficient of resistance that is lower than that of the heater.

In this waveguide device, a heater that heats only one waveguide section of the pair of waveguide sections which make up the Mach-Zehnder interferometer is connected in series to a resistor having a prescribed resistance and that has lower temperature dependency then the heater. The principles of this device will be explained later, but this simple configuration can effectively prevent fluctuations in phase with respect to changes in temperature. This type of waveguide device is typically configured as a silica glass waveguide device and can be ideally used as a variable optical attenuator.

The second waveguide device according to the present invention includes: two directional couplers formed in series; first and second waveguide sections provided between the two directional couplers; a heater arranged at a position corresponding to the first waveguide section for heating the first waveguide section; and a resistor connected, in series with the heater, to the power supply which supplies the heater with electric power, said resistor having a temperature coefficient of resistance which is lower than that of the heater.

In this waveguide device, a heater, which is provided for heating one of the two waveguide sections interposed between the two directional couplers which are formed in series, is connected in series to a resistor having a prescribed resistance and lower temperature dependency than the heater. The device can therefore reduce fluctuation in characteristics due to temperature changes by means of a simple configuration. This type of waveguide device is typically configured as a silica glass waveguide device and can be ideally used as an optical switch.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 1A:
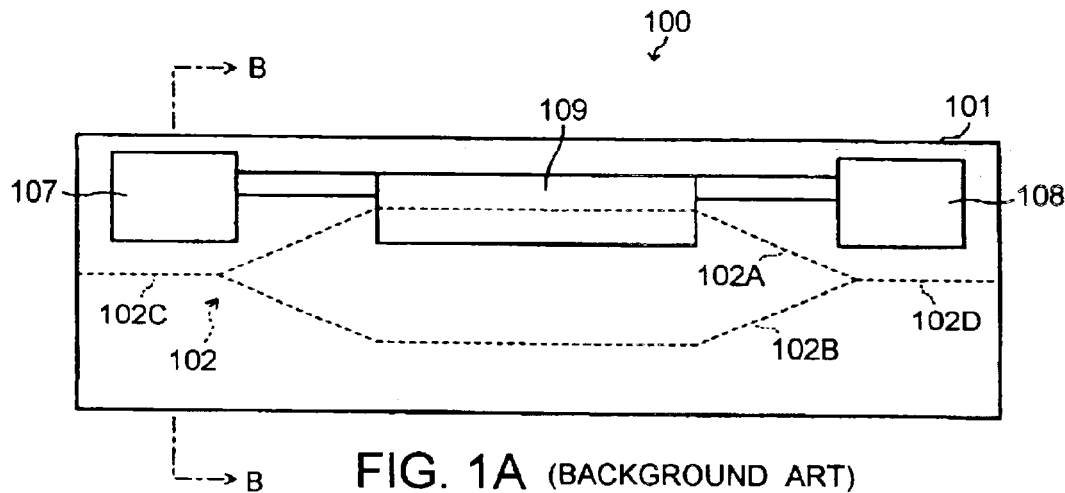
FIG. 1A is a schematic plan view showing the configuration of an example of a Mach-Zehnder optical attenuator of the prior art
Figure 1B:
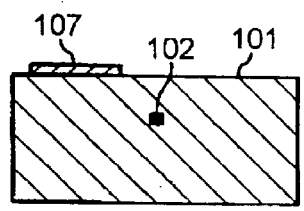
FIG. 1B is a sectional view taken along line B—B of FIG. 1A.
Figure 4A:
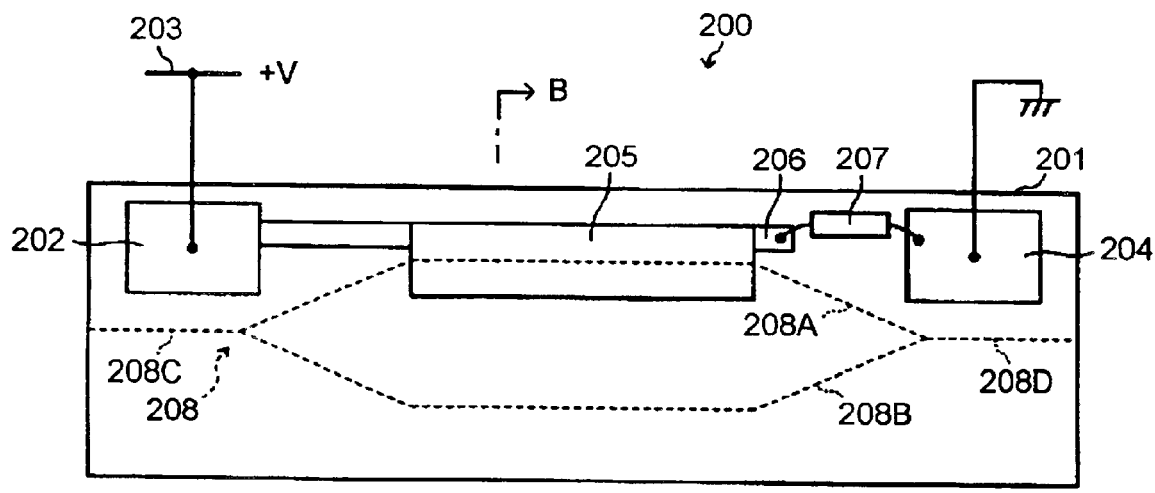
FIG. 4A is a schematic plan view showing the configuration of the variable optical attenuator according to the first embodiment of the present invention.
Figure 4B:
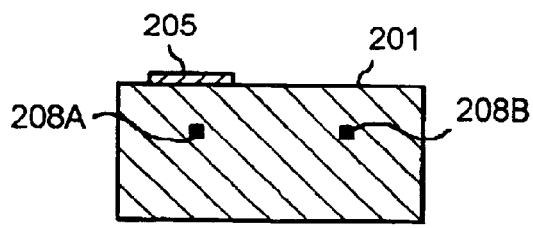
FIG. 4B is a sectional view taken along line B—B of FIG. 4A.

Variable optical attenuator 200 according to the first embodiment of the present invention that is shown in FIGS. 4A and 4B, as with the variable optical attenuator of the prior art that was shown in FIGS. 1A and 1B, is configured as a planar lightwave circuit (PLC) using substrate 201 that is composed of silica glass. As shown in FIG. 4B, glass waveguide 208 is embedded inside substrate 201 in variable optical attenuator 200. Waveguide 208 is branched into two waveguide sections 208A and 208B in the central portion of substrate 201, and at points other than the central portion of the substrate, is formed as incident-side waveguide section 208C and emission-side, waveguide section 208D.

Light that is incident from waveguide section 208C is branched by a Y-branch to two waveguide sections 208A and 208B, and then again combined by Y-branch to be emitted to the outside from waveguide section 208D. Waveguide sections 208A and 208B have substantially the same length.

First electrode plate 202 that is composed of gold (Au) and second electrode plate 204 that is similarly composed of gold are formed on the surface of substrate 201. First electrode plate 202 is connected to driving dc power supply line 203 to which voltage +V is applied. Second electrode plate 204 is connected to ground. First electrode plate 202 has strip-shaped extended portion 202A that extends in the direction of extension of waveguide section 208A, and one end of heater 205 that is composed of gold is connected to extended portion 202A. Heater 205 is formed on the surface of substrate 201 at a position that overlies one waveguide section 208A with substrate 201 interposed, in heater 205, thickness of the gold film is smaller than each of electrode plates 202 and 204 to produce an electrical resistance component for heating. Thick terminal portion 206 that is similarly composed of gold is formed at the other end of heater 205. Resistance element, that is, resistor, 207 having resistance $R_S$ is connected by soldering between terminal portion 206 and second electrode plate 204.

In this case, heater 205 is formed from the same material as the material for forming electrode plates 202 and 204 and the metal portions for connecting these components, but heater 205 may also be composed of a different material.

Figure 5:
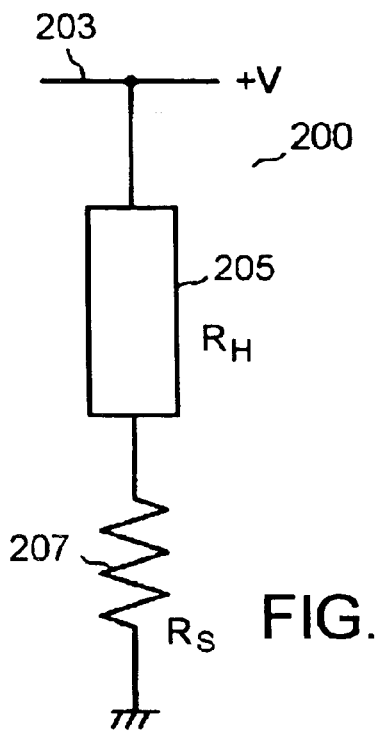
FIG. 5 is an equivalent circuit diagram of the variable optical attenuator shown in FIGS. 4A and 4B.

FIG. 5 is an equivalent circuit diagram of the electrical circuits of the variable optical attenuator shown in FIGS. 4A and 4B. This circuit is composed of heater 205 having one end connected to dc power supply line 203 and commercially marketed resistor 207 connected between the other end of this heater 205 and a ground node. Resistor 207 has resistance $R_S$ and is a metal film resistor or a metal oxide film resistor, for example. These resistors can be made of, for example, platinum (Pt), chromium (Cr), tungsten (W), gold (Au), or the like. The temperature coefficient of resistance of this commercially marketed resistor 207 is, for example, on the order of +25 ppm (parts per million)/° C., and the temperature dependency of this resistance is therefore far lower than that of heater 205 that is composed of, for example, gold or platinum formed on substrate 201. The gold or platinum film making up heater 205 has a temperature coefficient of resistance of positive several thousand ppm/° C.

In the variable optical attenuator of this embodiment as well, supplying electric power to heater 205 causes heater 205 to emit heat, whereby one waveguide section 208A is heated and the refractive index in this waveguide section 208A becomes greater than the refractive index of the other waveguide section 208B. As a result, the propagation speed of light in one waveguide section 208A becomes lower than the propagation speed of light in the other waveguide section 208B. Further, of the light that is branched between the two waveguide sections 208A and 208B, the phase of light that is propagated through heated waveguide section 208A gradually shifts and delays in accordance with the rise in temperature to produce a phase difference between light that is propagated through one waveguide section 208A and light that is propagated through the other waveguide section 208B. Accordingly, light that is obtained at waveguide section 208D on the emission side is attenuated in accordance with this phase difference.

Figure 6:
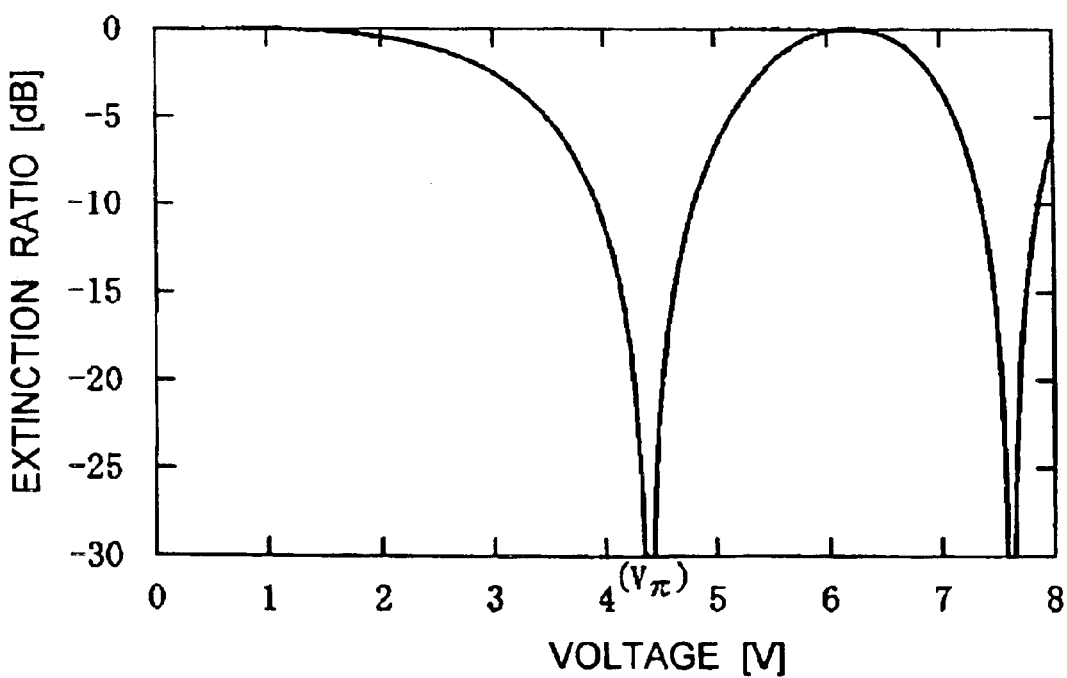
FIG. 6 is a graph showing the temperature dependency of the extinction characteristic in the variable optical attenuator shown in FIGS. 4A and 4B.

FIG. 6 shows the results of measuring the temperature dependency of the extinction characteristics for this type of variable optical attenuator. Voltage $V_\pi$ is the voltage at which the extinction ratio reaches a maximum, the extinction ratio being the ratio of the maximum intensity to the minimum intensity of transmitted light in variable optical attenuator 200.

Figure 2:
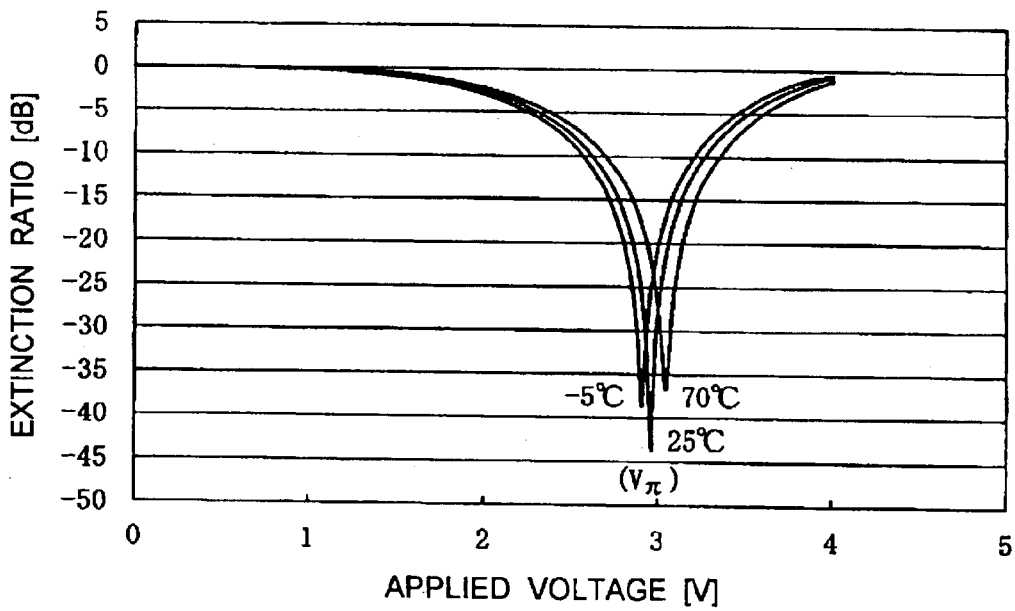
FIG. 2 is a graph showing the temperature dependency of the extinction characteristics in the variable optical attenuator shown in FIGS. 1A and 1B.

In the variable optical attenuator of the prior art shown in FIGS. 1A and 1B, voltage $V_\pi$ tends to increase together with increase in temperature and the voltage characteristics curve of the extinction ratio also fluctuates with the temperature as shown in FIG. 2. However, in the variable optical attenuator of the present embodiment, the voltage $V_\pi$ at which the extinction ratio is a maximum undergoes virtually no change and the voltage characteristics curve of the extinction ratio generally matches despite temperature changes to −5° C., 25° C., and 70° C., as shown in FIG. 6. Thus, it can be seen that the present embodiment can obtain an extremely stable extinction characteristic with respect to fluctuation in the ambient temperature without using a special temperature control circuit.

The present embodiment, by means of a simple configuration in which a resistor 207 having a prescribed resistance R is connected in series to the heater of the variable optical attenuator that was used in the prior art, exhibits the excellent effect of eliminating the temperature dependency of the extinction characteristics of variable optical attenuator 200 within a practical temperature range without using a temperature control circuit. Explanation next regards the reasons for this capability and the resistance R of resistor 207 used for this purpose.

Figure 3:
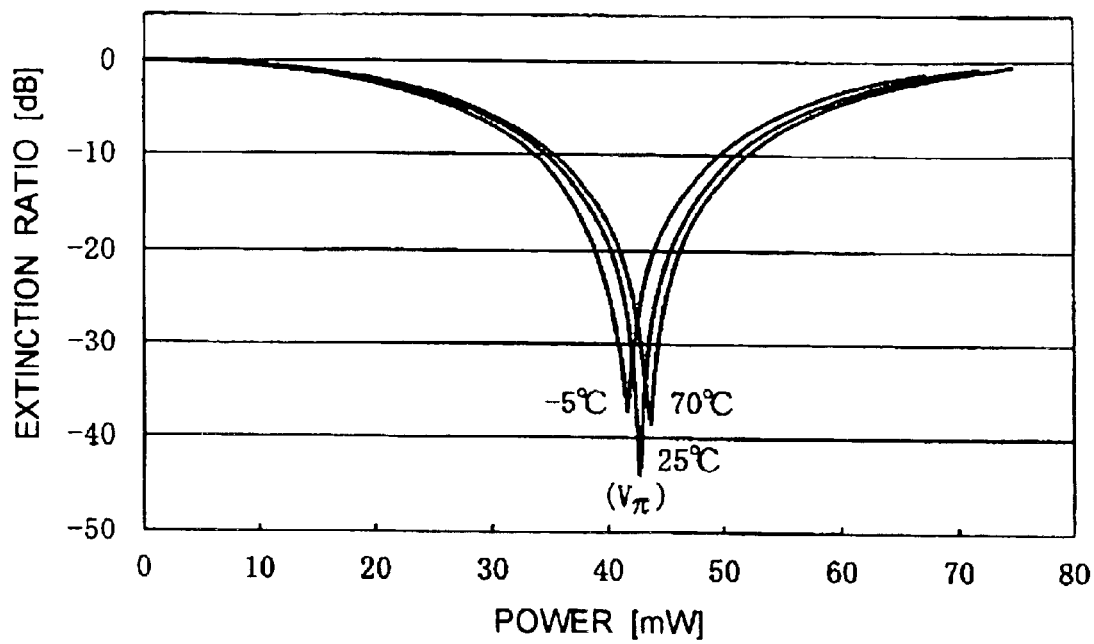
FIG. 3 is a graph showing the change in the extinction ratio with respect to electric power in the variable optical attenuator shown in FIGS. 1A and 1B.
Figure 7:
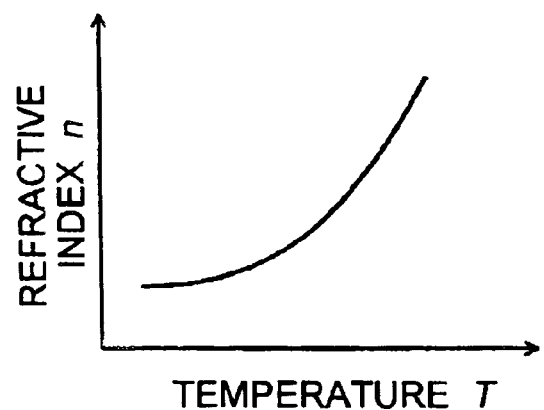
FIG. 7 is a graph showing the relation between the temperature and refraction index of a silica glass substrate.

FIG. 7 shows the relation between the refractive index and the temperature of the silica glass substrate that is used in the present embodiment. In the silica glass substrate used in variable optical attenuator 200, refractive index n rises with increase in temperature T. This temperature change characteristic, rather than being a linear relation in which refractive index n is proportional to temperature T, exhibits nonlinear change as shown in the figure. This is the reason for the temperature dependency that was generated in the variable optical attenuator of the prior art, as shown in FIG. 2 or FIG. 3.

In contrast, dc power supply line 203 in variable optical attenuator 200 of the present embodiment is a constant-voltage line of voltage +V(volts). If the resistance of heater 205 is $R_H$, the combined resistance R produced by heater 205 and resistor 207 is the sum of these resistances ($R=R_H+R_S$). If the ambient temperature rises and the resistance $R_H$ of heater 205 also increases in this case, the voltage $V_H$ across the two ends of heater 205 increases similarly as shown by equation (2) due to the presence of resistance $R_S$ of resistor 207, in which resistance does not increase as much as that of heater 205 in response to the increase in temperature.

$$V_H = \frac{R_H}{R} = \frac{R_H}{(R_H + R_S)} \tag{2}$$

In this connection, in the variable optical attenuator of the prior art that is shown in FIGS. 1A and 1B, the absence of a resistance element having a temperature coefficient of resistance that is lower than that of the heater means that there is no resistance $R_S$ in equation (2). Accordingly, the variable optical attenuator of the prior art is a case in which $R_S$ is zero ($R_S=0$) in equation (2), and voltage $V_H$ across the two ends of the heater therefore does not change despite increase in temperature.

When resistance $R_H$ of heater 205 changes due to change in the ambient temperature in variable optical attenuator 200 of the present embodiment, voltage $V_H$ applied to heater 205 increases in a form that compensates for this change, thereby enabling a prevention of change in voltage $V_\pi$ at which the extinction ratio reaches a maximum with respect to temperature change, as well as change in the power consumption $P_\pi$ in the heater. This is the basic principle of the present invention.

Explanation next regards the calculation of resistance $R_S$ of resistor 207 for meeting the above-described conditions. If $P_H$ is the power that is consumed by heater 205 of variable optical attenuator 200 in which resistor 207 is connected, this value can be found by the following equation (3):

$$P_H = \frac{V^2 R_H}{(R_H + R_S)^2} \tag{3}$$

where voltage V represents the voltage between dc power supply line 203 and ground. Resistance $R_H$ is a function of temperature T, and can be approximated by equation (4):

$$R_H(T) = c + d \cdot T \tag{4}$$

If the measurement results for the variable optical attenuator that was actually produced in the present embodiment are applied in equation (4), constant c is 192.83 Ω, and coefficient d is 0.3753 Ω/° C.

The extinction ratio ER(P) of a symmetrical Mach-Zehnder interferometer in which waveguides are branched symmetrically such as shown in FIGS. 1A, 1B, 4A, and 4B can be found by means of equation (5):

$$ER(p) = \cos^2\left\{\frac{P(V,T)}{P_\pi(T)} \cdot \frac{\pi}{2}\right\} \tag{5}$$

Here, power $P_\pi$ represents the heater power when the phase of a phase shifter is shifted exactly π radian. Power $P_\pi(T)$ has temperature dependency and, based on the description of FIG. 3, is approximated by equation (6) in the case of the present embodiment. In addition, power P depends on voltage V and temperature T. In addition, the symbols "V" or "T" that appear within brackets in equation (5) etc. indicate functions of voltage and temperature, respectively.

$$P_\pi(T) = 43.469 - 0.0267 \cdot T \tag{6}$$

In order to minimize the temperature dependency of variable optical attenuator 200, the argument of equation (5) should be the differentiation at temperature T to find resistance $R_S$ at which the differentiation equals zero. In other words, resistance $R_S$ should be found such that the following equation (7) is realized:

$$\frac{d}{dt}\left\{\frac{P(V,T)}{P_\pi(T)}\frac{\pi}{2}\right\}=0 \tag{7}$$

Variable optical attenuator 200 can thus be realized in which fluctuation of power $P_\pi$ remains negligible even though temperature T may fluctuate within a certain range. FIG. 6 shows the measurement results of the extinction ratio according to applied voltage at each of the temperatures of −5° C., 25° C. and 70° C. that have been obtained in this way. The characteristics curves for each temperature match completely and are drawn as a single curve.

When resistance $R_s$ of a commercially marketed resistor 207 is compared with heater 205 as described above, the fluctuation in resistance with respect to changes in temperature is of a negligible level. Accordingly, even though resistor 207 is installed directly on silica glass substrate 201 and therefore experiences an increase in temperature due to heater 205 as shown in FIGS. 4A and 4B, this influence is actually negligible.

The above-described variable optical attenuator 200 can obviously be used as an optical switch by driving the heater at either a condition in which the extinction ratio is minimized or a condition in which the extinction ratio is maximized.

Figure 8:
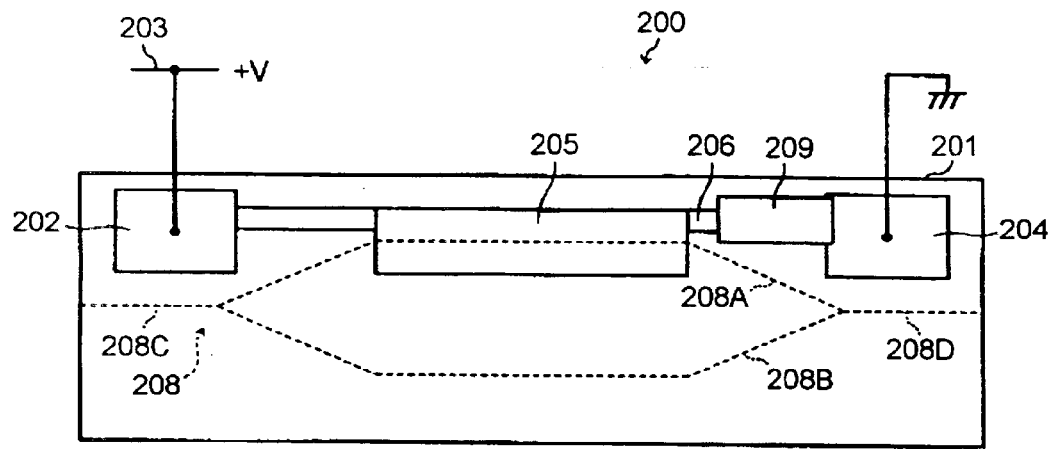
FIG. 8 is a schematic plan view showing a variable optical attenuator having a thin-film resistor.

Although commercially marketed resistor 207 was installed by soldering in the foregoing explanation, it is also possible to use thin-film resistor 209 of a material having a low temperature coefficient of resistance such as tantalum (Ta) which is formed on the surface of substrate 201 between terminal portion 206 of heater 205 and second electrode plate 204 by a method such as sputtering, as shown in FIG. 8.

Although a symmetrical Mach-Zehnder interferometer having symmetrical waveguide sections was used in the variable optical attenuator of the present embodiment, the present invention can also be applied to an optical attenuator that is composed of an asymmetrical Mach-Zehnder interferometer in which a single waveguide is branched and combined in an asymmetrical form.

Figure 9:
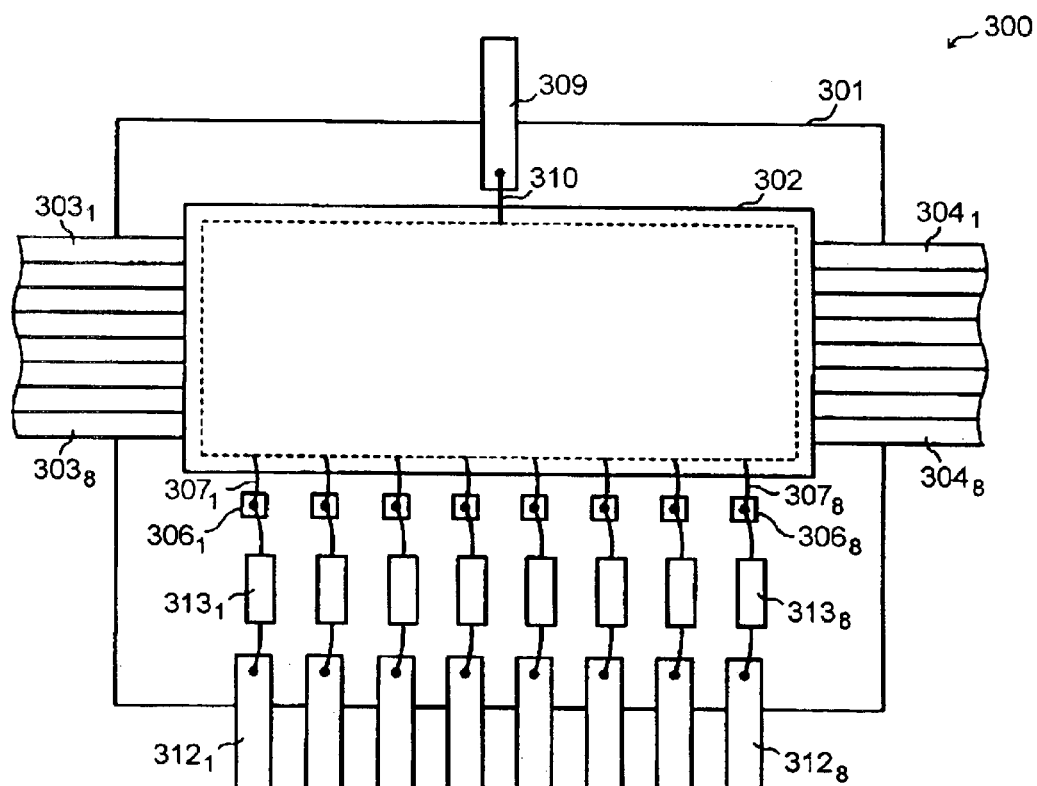
FIG. 9 is a schematic plan view showing a variable optical attenuator array based on the first embodiment.

FIG. 9 illustrates a variable optical attenuator array that employs the above-described variable optical attenuator.

Variable optical attenuator array 300 is a device that, principally, is configured by arranging a plurality of the variable optical attenuator shown in FIGS. 4A and 4B as a module of array structure. Variable optical attenuator array 300 is provided with silica glass substrate 302 that is arranged on module unit 301 (or a subcarrier). In this example, one end of each of eight optical fibers $303_1$ to $303_8$ is attached to the input side of silica glass substrate 302 for each channel, and one end of each of eight optical fibers $304_1$ to $304_8$ is attached to the output side of this substrate 302 for supplying optical signals that have undergone attenuation separately according to channel.

Eight variable optical attenuators having a configuration similar to the variable optical attenuator 100 shown in FIGS. 1A and 1B are arranged in parallel on silica glass substrate 302, and each variable optical attenuator is provided with both a heater and a pair of electrodes for supplying electric power to the heater. The first electrode corresponds to terminal portion 206 shown in FIG. 4A and the second electrode corresponds to first terminal plate 202 shown in FIG. 4A. For each variable optical attenuator, the first electrodes of each attenuator is connected by bonding wires $307_1$ to $307_8$ to a corresponding conductor pattern of first to eighth connection conductor patterns $306_1$ to $306_8$ that are provided on module unit 301. The second electrodes of respective variable optical attenuators are connected in common to ground terminal 309 by means of bonding wire 310. Commercially marketed resistors $313_1$ to $313_8$ are surface-mounted by soldering between first to eighth connection conductor patterns $306_1$ to $306_8$ and first to eighth power supply application terminals $312_1$ to $312_8$ that are provided in one-to-one correspondence to these connection conductor patterns.

In variable optical attenuator array 300 of this configuration, the attenuation factors of the optical signals can be varied by channel in accordance with the intensity of the optical signals that are transmitted in on eight optical fibers $303_1$ to $303_8$. In contrast with the variable optical attenuator that is shown in FIGS. 4A and 4B in which resistor 207 was installed on silica glass substrate 201, resistors $313_1$ to $313_8$ in this attenuator array are installed for each attenuator in an area that is separated from silica glass substrate 302 in the module.

In variable optical attenuator array 300, voltage according to the attenuation factor of each of the channels is applied to power supply application terminals $312_1$ to $312_8$. When the attenuation factor on each channel is always the same, first to eighth power supply application terminals $312_1$ to $312_8$ can be shared as a single terminal.

In this variable optical attenuator array 300 as well, the extinction characteristics of each of the channels are stable despite fluctuation in the ambient temperature, as in the variable optical attenuator according to the above-described embodiment.

Figure 10:
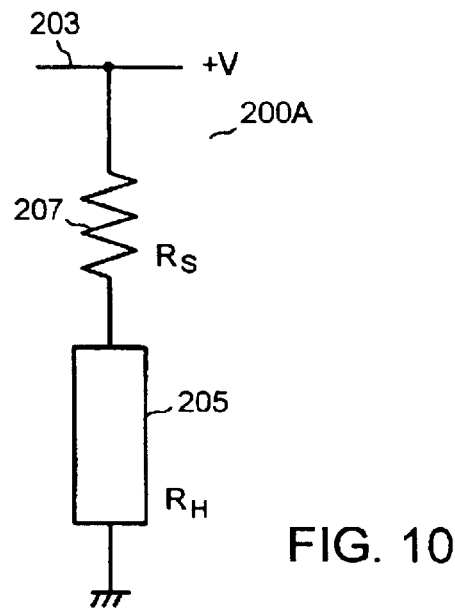
FIG. 10 is an equivalent circuit diagram showing an example of different connections in a variable optical attenuator.

Moreover, in variable optical attenuator array 300, resistors are provided on the dc power supply line side and a heater is provided on the ground side. In the variable optical attenuator of the embodiment that was shown in FIGS. 4A and 4B, heater 205 may also be arranged on the ground side. FIG. 10 is an equivalent circuit diagram of this type of variable optical attenuator. In variable optical attenuator 200A that is shown in the figure, resistor 207 is connected to dc power supply line 203, and heater 205 is connected to ground.

Figure 11:
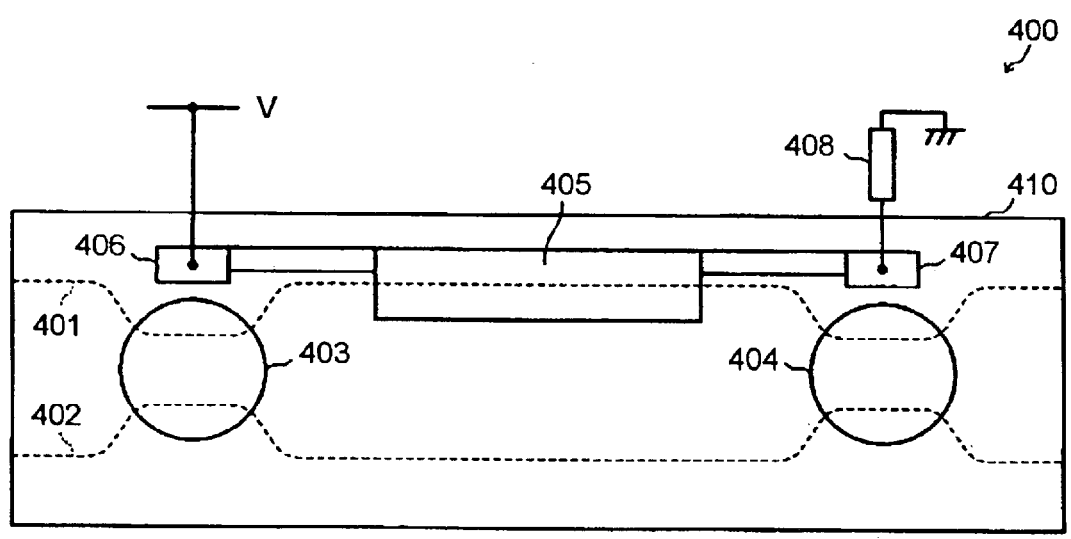
FIG. 11 is a schematic plan view showing the configuration of the optical waveguide type optical switch according to the second embodiment of the present invention.

Explanation next regards an optical waveguide type optical switch that is based on the present invention. FIG. 11 presents an outline of the configuration of this optical switch.

Optical switch 400 is provided with: a pair of optical waveguides 401 and 402 that have both ends connected to optical fibers (not shown); and first and second directional couplers 403 and 404 that are arranged at positions in the vicinities of the input side and output side of these optical waveguides 401 and 402 and that join this pair of optical waveguides 401 and 402. Optical waveguides 401 and 402 are configured as silica glass waveguides, and directional couplers 403 and 404 also have a silica glass waveguide construction. Optical waveguides 401 and 402 and directional couplers 403 and 404 are embedded in silica glass substrate 410.

Heater 405 is arranged on the surface of substrate 410 in the vicinity of one optical waveguide 401 in the region that is interposed between first and second directional couplers 403 and 404, heater 405 being configured to heat one optical waveguide 401. One end of heater 405 is connected to first electrode 406 that is connected to a voltage +V power supply, and the other end of heater 405 is connected to second electrode 407. Commercially marketed resistor 408 having a temperature coefficient of resistance that is lower than that of the heater is connected between second electrode 407 and ground. Regarding the material that constitutes the heater and the type of resistor, the same components can be used that were used in the variable optical attenuator that was shown in FIG. 4A and 4B.

In optical switch 400 of this type, the incidence of signal light from one of two optical waveguides 401 and 402 as well as the production of a phase difference by means of the temperature of heater 405 allows switching of the optical signal from one of the two output sides. In this optical switch 400 as well, the serial connection of resistor 408 to heater 405 allows the stabilization of the switching characteristics regardless of the temperature, as in the above-described variable optical attenuator. Optical switch 400 can obviously also be used as a variable optical attenuator by adjusting the amount of power that is applied to heater 405 to control the level of emitted heat.

Still further, an optical switch array can also be configured as with the variable optical attenuator array that was shown in FIG. 9 by arranging an optical switch such as shown in FIG. 11 on a substrate for each channel.

In the present invention as described in the foregoing explanation, the serial connection of a fixed resistor for minimizing the temperature characteristic to the heater itself in a heater type variable optical attenuator or optical switch allows a large-scale reduction of the temperature dependency of the extinction characteristic, which has been a problem in the prior art. Moreover, by the extremely simple means of simply using a commercially marketed resistor and without necessitating a major design modification such as the selection of a heater material having low temperature dependency, the present invention not only enables a major improvement of the temperature characteristic of an optical waveguide device such as a variable optical attenuator or optical switch, but also allows a greater improvement in reliability than a case of providing a complicated electronic circuit. The present invention can thus reduce the costs of building a communication system that employs optical waveguide devices.

While preferred embodiments of the present invention have been described using specific terms, such description is for illustrative purposes only, and it is to be understood that changes and variations may be made without departing from the spirit or scope of the following claims.

What is claimed is:

1. A waveguide device comprising:
   a substrate;
   a Mach-Zehnder interferometer that is provided on said substrate and that includes first and second waveguide sections interposed between a pair of branches;
   a heater having a conductive thin-film that is formed at a position corresponding to said first waveguide section, and that heats said first waveguide section by emitted heat to cause a phase shift in a light signal propagated in said first waveguide section; and
   a resistor connected in series with said heater to a power supply which supplies power to said heater, said resistor having a temperature coefficient of resistance that is lower than that of said heater.

2. The waveguide device according to claim 1, wherein each of said waveguide sections is formed as a silica glass waveguide.

3. The waveguide device according to claim 2, wherein said Mach-Zehnder interferometer is a symmetrical Mach-Zehnder interferometer in which said pair of waveguide sections are formed symmetrical to each other.

4. The waveguide device according to claim 1, wherein, when the resistance of said resistor is $R_S$ and the resistance of said heater is $R_H$, said resistance $R_S$ is set such that the partial voltage $V_H$ of the heater increases to compensate for change in resistance $R_H$ caused by change in temperature of said heater.

5. The waveguide device according to claim 2, wherein said heater is composed of a resistance material that is formed by a sequence of film formation processes on said substrate.

6. The waveguide device according to claim 5, wherein said heater is formed from gold or platinum.

7. The waveguide device according to claim 5, wherein said resistor is a thin-film resistor formed by the sequence of film formation processes on said substrate.

8. The waveguide device according to claim 7, wherein said heater is formed from gold or platinum.

9. A waveguide device, comprising:
   two directional couplers formed in series;
   first and second waveguide sections provided between said two directional couplers;
   a heater arranged at a position corresponding to said first waveguide section for heating said first waveguide section; and
   a resistor connected, in series with said heater, to a power supply which supplies power to said heater, said resistor having a temperature coefficient of resistance that is lower than that of said heater.

10. The waveguide device according to claim 9, wherein each of said waveguide sections is formed as a silica glass waveguide.

11. A variable optical attenuator comprising the waveguide device according to claim 1.

12. An optical switch comprising the waveguide device according to claim 1.

13. An optical switch comprising the waveguide device according to claim 10.

14. A variable optical attenuator array comprising a plurality of variable optical attenuators according to claim 11 arranged on a single waveguide substrate.

15. An optical switch array comprising a plurality of optical switches according to claim 12 arranged on a single waveguide substrate.

* * * * *